US010948327B2

(12) United States Patent
French et al.

(10) Patent No.: US 10,948,327 B2
(45) Date of Patent: Mar. 16, 2021

(54) FITMENT OR ADAPTER FOR A FLUID CONTAINER

(71) Applicant: Berry Global, Inc., Evansville, IN (US)

(72) Inventors: Jordan Robert French, Evansville, IN (US); Seth Tempel, Evansville, IN (US); Jason Rowe, Santa Claus, IN (US)

(73) Assignee: Berry Global, Inc., Evansville, IN (US)

(*) Notice: Subject to any disclaimer, the term of this patent is extended or adjusted under 35 U.S.C. 154(b) by 62 days.

(21) Appl. No.: 16/381,170

(22) Filed: Apr. 11, 2019

(65) Prior Publication Data

US 2019/0316945 A1 Oct. 17, 2019

Related U.S. Application Data

(60) Provisional application No. 62/656,106, filed on Apr. 11, 2018.

(51) Int. Cl.
*G01F 11/28* (2006.01)
*B65D 47/12* (2006.01)

(52) U.S. Cl.
CPC .......... *G01F 11/286* (2013.01); *B65D 47/122* (2013.01); *B65D 47/127* (2013.01)

(58) Field of Classification Search
CPC .... G01F 11/286; B65D 47/122; B65D 47/127
USPC ........................................................ 222/205
See application file for complete search history.

(56) References Cited

U.S. PATENT DOCUMENTS

| | | | |
|---|---|---|---|
| 1,989,145 A | 1/1935 | Newby | |
| 2,164,172 A | 6/1939 | Dalton | |
| 2,714,975 A | 8/1955 | Greene | |
| 3,089,623 A | 5/1963 | Padzieski | |
| 3,921,860 A | 11/1975 | Silver | |
| 4,077,547 A | 3/1978 | Donoghue | |
| 4,106,673 A | 8/1978 | Donoghue | |
| 4,625,897 A * | 12/1986 | Wortley | G01F 11/286 222/205 |
| 4,660,746 A | 4/1987 | Wright | |
| 4,875,603 A | 10/1989 | Weinstein | |
| 5,255,823 A | 10/1993 | Tichy et al. | |
| 5,330,081 A | 7/1994 | Davenport | |
| 6,209,757 B1 | 4/2001 | Dumont | |
| 6,330,960 B1 | 12/2001 | Faughey et al. | |
| 6,343,723 B1 | 2/2002 | Hickerson | |
| 6,547,105 B1 * | 4/2003 | Seelhofer | B65D 1/32 222/205 |
| 7,063,229 B2 | 6/2006 | Westerhof et al. | |
| 7,815,073 B1 | 10/2010 | Fairchild | |
| 7,976,234 B2 | 7/2011 | May | |
| 8,485,378 B2 | 7/2013 | Zoss et al. | |
| 8,579,164 B1 | 11/2013 | Sanguinet et al. | |
| 8,985,390 B2 | 3/2015 | Altonen et al. | |
| 9,387,965 B2 | 7/2016 | Skillin et al. | |
| 9,579,262 B2 | 2/2017 | Crawford et al. | |
| 2008/0308183 A1 | 12/2008 | Law | |

(Continued)

FOREIGN PATENT DOCUMENTS

| | | |
|---|---|---|
| WO | 1996003625 A1 | 2/1996 |
| WO | 2000078628 A1 | 12/2000 |

*Primary Examiner* — Jeremy Carroll (57) ABSTRACT

A fitment for a container that includes a chamber fillable with contents from a container is disclosed.

20 Claims, 11 Drawing Sheets

(56) References Cited

U.S. PATENT DOCUMENTS

2017/0029177 A1* 2/2017 Holroyd ................ G01F 11/262
2019/0047754 A1* 2/2019 Dubiel .................. G01F 11/006

* cited by examiner

FITMENT OR ADAPTER FOR A FLUID CONTAINER

PRIORITY CLAIM

This application claims priority under 35 U.S.C. § 119(e) to U.S. Provisional Application Ser. No. 62/656,106, filed Apr. 11, 2018, which is expressly incorporated by reference herein.

TECHNICAL FIELD

The present disclosure relates generally to a fitment and/or an adapter for a container, and more specifically to a fitment and/or adapter in fluid communication with the container.

BACKGROUND

It is often desirable to measure or separate contents of a container for dispensing. For example, a user or consumer may wish to access and/or consume some but not all of the contents of a container.

SUMMARY

Certain embodiments according to the present disclosure provide a fitment for a container that provides fluid communication between a product storage region of the container and a chamber, such as a dispensing or measuring chamber.

In one aspect, for instance, some embodiments may provide a package that includes a container, a fitment, and an adapter. The container defines a product storage region. The fitment and adapter are coupled to the container and in fluid communication with the product storage region. The adapter includes a side wall and a floor substantially defining a chamber, and at least one stem adjacent the side wall and extending upwardly from the adapter floor. At least one stem has at least one outlet allowing fluid from the product storage region flowing through the fitment and adapter to enter the chamber.

The stem may include a hood configured to direct the fluid at least one of downwardly and outwardly into the chamber to resist splashing out of the chamber. The stem may include at least one outlet floor. At least one outlet floor may be angled outwardly and downwardly to facilitate a smooth flow into the chamber. The adapter may be removable from the fitment. The adapter may be friction fit in a bowl of the fitment and/or the adapter may snap fit in the bowl of the fitment. The fitment may include a floor spaced apart from the floor of the adapter, wherein a lower chamber is disposed between the fitment floor and the adapter floor. The fitment floor may include a central portion with an opening in fluid communication with the product storage region, and the adapter floor may include at least one floor opening adjacent the side wall and out of vertical alignment with the fitment central portion opening, such that fluid flow is directed outwardly relative to a central axis from the central portion to the adapter floor opening to enter the at least one stem and adapter chamber. The adapter may be configured to hold a predetermined amount of liquid at or below the stem outlet. The predetermined amount may be between about half an ounce and about two ounces, for example.

In another aspect, for instance, some embodiments may provide a fitment with an adapter or insert. The fitment is configured to be coupled to a container, the fitment including a bottom opening and a bowl above the bottom opening. The insert is insertable into the bowl of the fitment and in fluid communication with the fitment, the insert having a floor and a sidewall defining a chamber. The insert includes at least one stem adjacent the sidewall and extending upwardly from the insert floor. The at least one stem has at least one outlet allowing fluid from the product storage region flowing through the fitment and insert to enter the chamber.

The insert may be removable from the fitment. The stem may include a hood configured to direct the fluid at least one of downwardly and outwardly into the chamber to resist splashing out of the chamber. The fitment may include a floor spaced apart from the floor of the adapter, wherein a lower chamber is disposed between the fitment floor and the adapter floor.

In yet another aspect, for instance, some embodiments may provide an adapter or insert for a fitment or container. The insert includes a floor and sidewall defining a chamber. The insert also includes at least one stem adjacent the sidewall and extending upwardly from the floor. The stem or stems define one or more fluid channels. The floor includes at least one peripheral opening allowing fluid to enter from below the floor and into the stem. The stem includes at least one outlet allowing fluid communication from the stem to the chamber.

The stem may include a hood configured to direct the fluid at least one of downwardly and outwardly into the chamber to resist splashing out of the chamber. The stem may include at least one outlet floor. The chamber may be configured to hold a predetermined amount of liquid at or below the stem outlet. The predetermined amount may be between about half an ounce and about two ounces, for example.

BRIEF DESCRIPTION OF THE DRAWINGS

The detailed description particularly refers to the accompanying figures, in which.

DETAILED DESCRIPTION

Embodiments now will be described more fully hereinafter with reference to the accompanying drawings, in which some, but not all embodiments are shown. As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Figure 1:
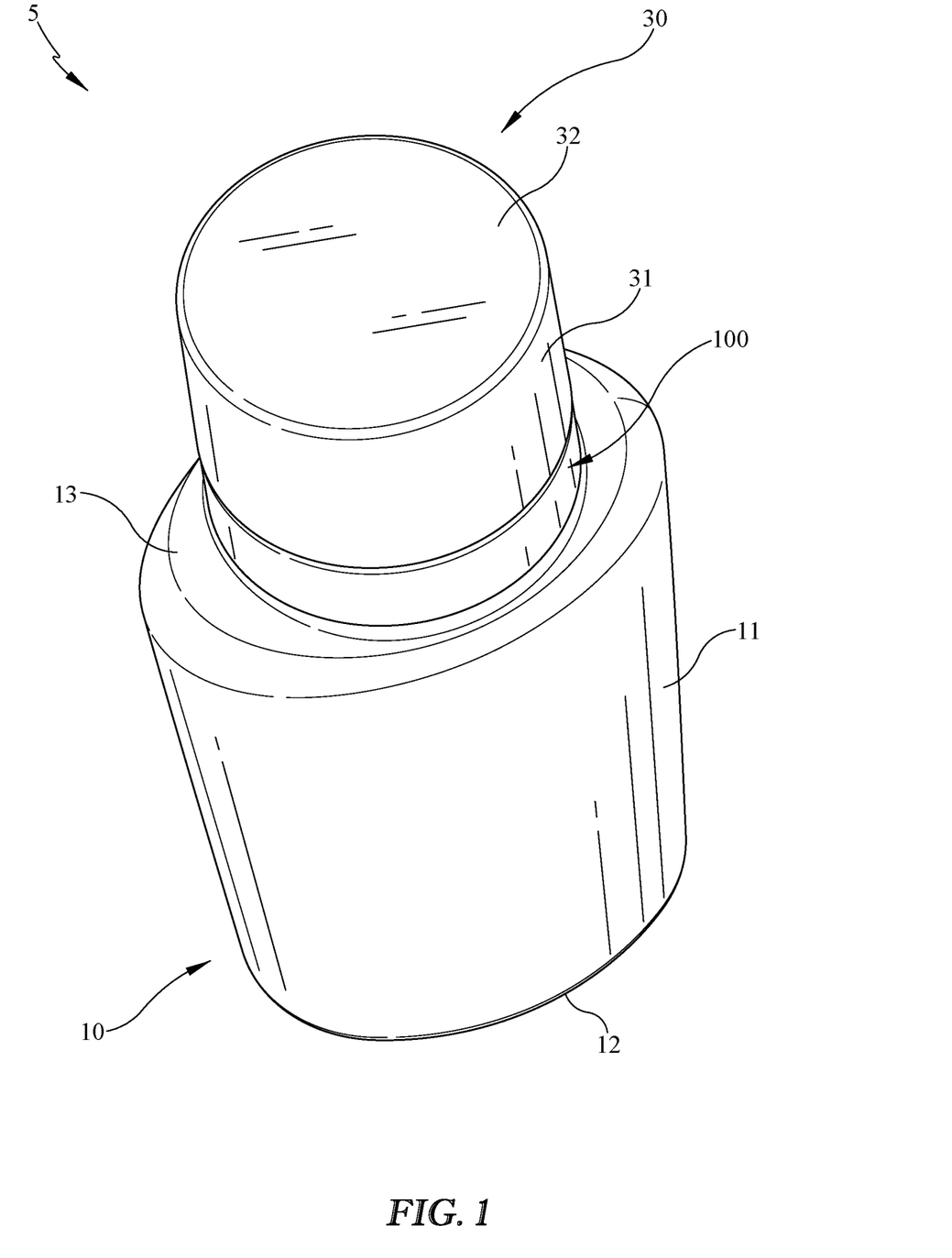
FIG. 1 illustrates a perspective view of an exemplary embodiment of a container with a fitment and a closure.

Some embodiments of a package 5 such as shown in FIG. 1 may include a container or bottle 10, a fitment 100, and/or a closure 30. If included, container 10 may include a side wall 11, a floor 12, and/or a shoulder 13, any or all of which may substantially define a product storage region 19 in container 10 (see, for example, FIG. 11). Package 5 is shown in FIG. 1 in an exemplary closed position with closure 30 attached, coupled, and/or fastened to fitment 100, with fitment 100 attached, coupled, and/or fasted to container 10. For example, closure 30 may snap on or screw on to fitment 100 and/or fitment 100 may snap on or screw on to container 10 as discussed more below. Closure 30 may be configured so that a user may selectively remove closure 30 from fitment 100 and/or container 10 to provide package 5 in an open position so that, for example, the user may access contents of container 10 and/or package 5. Closure 30 may be provided such that a user may selectively reclose container 10 and/or package 5 by reconnecting or reattaching closure 30 to fitment 100 and/or container 10.

Figure 2:
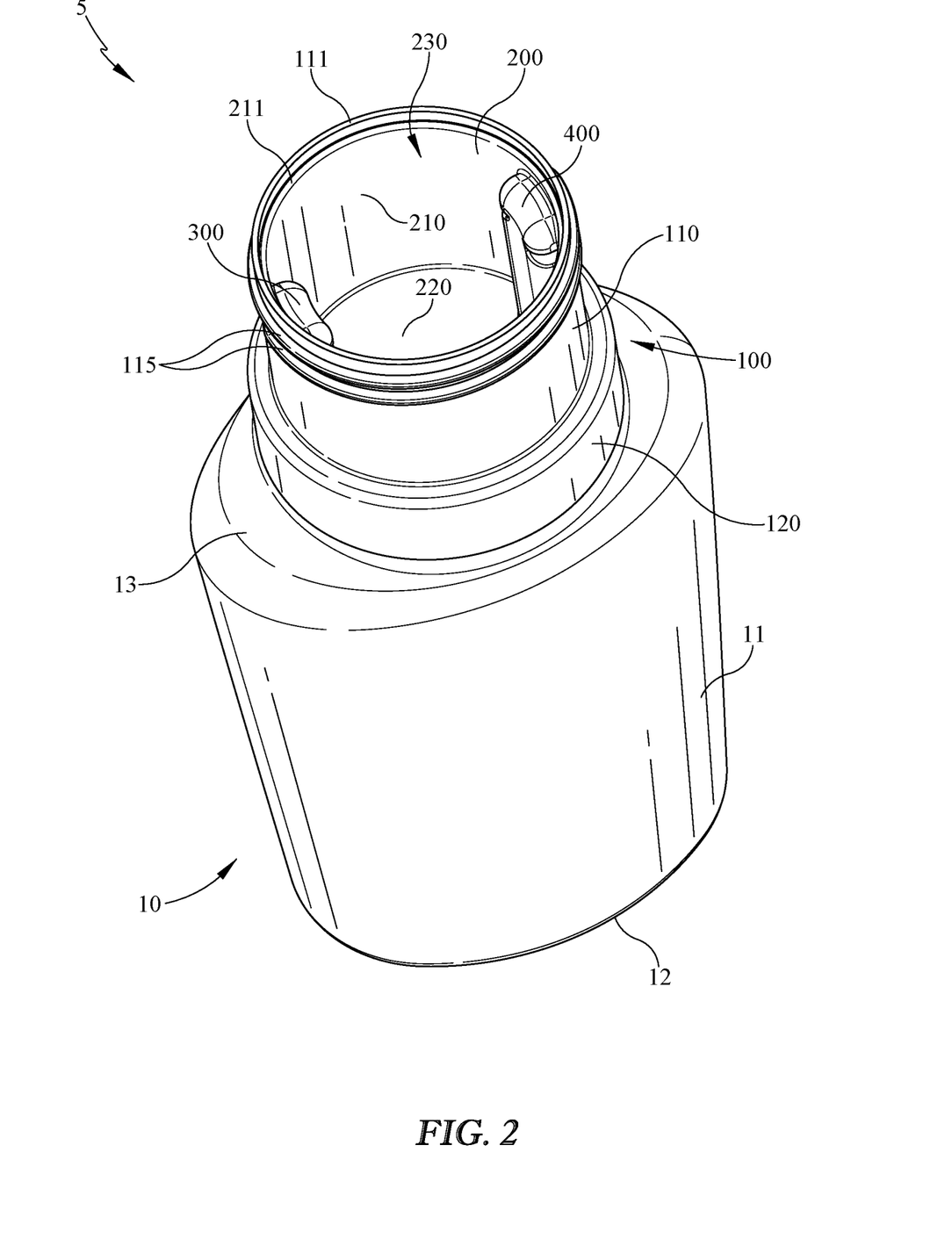
FIG. 2 illustrates a perspective view of the container of FIG. 1 with the closure removed to show the fitment in additional detail.

Package 5 may be provided in an open position such as is shown in FIG. 2, for example, with closure 30 substantially removed from fitment 100 and/or container 10. An insert or adapter 200 may be provided in fitment 100. Insert 200 may be configured to provide and/or allow fluid communication between product storage region 19 in container 10 and chamber 230. For example, insert 200 may be provided with one or more conduits for fluid, such as a first stem 300 and/or a second stem 400. Either or both stem 300, 400 may be provided with a channel or passage and/or be substantially hollow to allow fluid to pass or move from container 10 to chamber 230, for example, when a user actuates and/or squeezes side wall 11 of container 10.

Insert 200 and/or fitment 100 as shown in FIG. 2 may be configured to retain approximately a predetermined amount. For example, if container 10 is configured to store a beverage in product storage region 19, insert 200 and/or chamber 230 may be configured to hold about half to two ounces and/or one sip or drink of the beverage. A user may actuate container 10, such as by squeezing side wall 11 and/or container 10 to cause fluid in product storage region 19 to move under pressure through fitment 100 and/or insert 200, for example via one or both stems 300, 400, and into chamber 230. Either or both stem 300, 400 may be adjacent an outer or peripheral wall of adapter or insert 200 and/or fitment 100 for any of a variety of reasons. For example, disposing stem 300 and/or stem 400 in this way may facilitate controlling flow without spilling or splashing, and/or may provide stem 300 and/or 400 out of the way so as not to interfere with a user who may be, for example, drinking from chamber 230 (e.g., a centrally located stem may interfere with the user's mouth, nose, etc.). It is understood that, while storing beverage intended for drinking may be one exemplary use of package 5 and/or any component thereof, any of a variety of contents for any of a variety of uses may be used.

Insert 200, if included as shown in FIG. 2, may be inserted in and/or coupled, attached, and/or fastened to fitment 100 or any other component of package 5. For example, insert 200 may be at least partially separate from fitment 100 and inserted into fitment 100 with a friction fit, snap fit, threaded engagement, and/or other engagement mechanism retaining insert 200 in fitment 100. As another example, insert 200 may be substantially integral and/or unitary with fitment 100, as may be the case if insert 200 and fitment 100 are formed together, for example, from a single piece of material and/or at the same time during an injection molding process.

Figure 3:
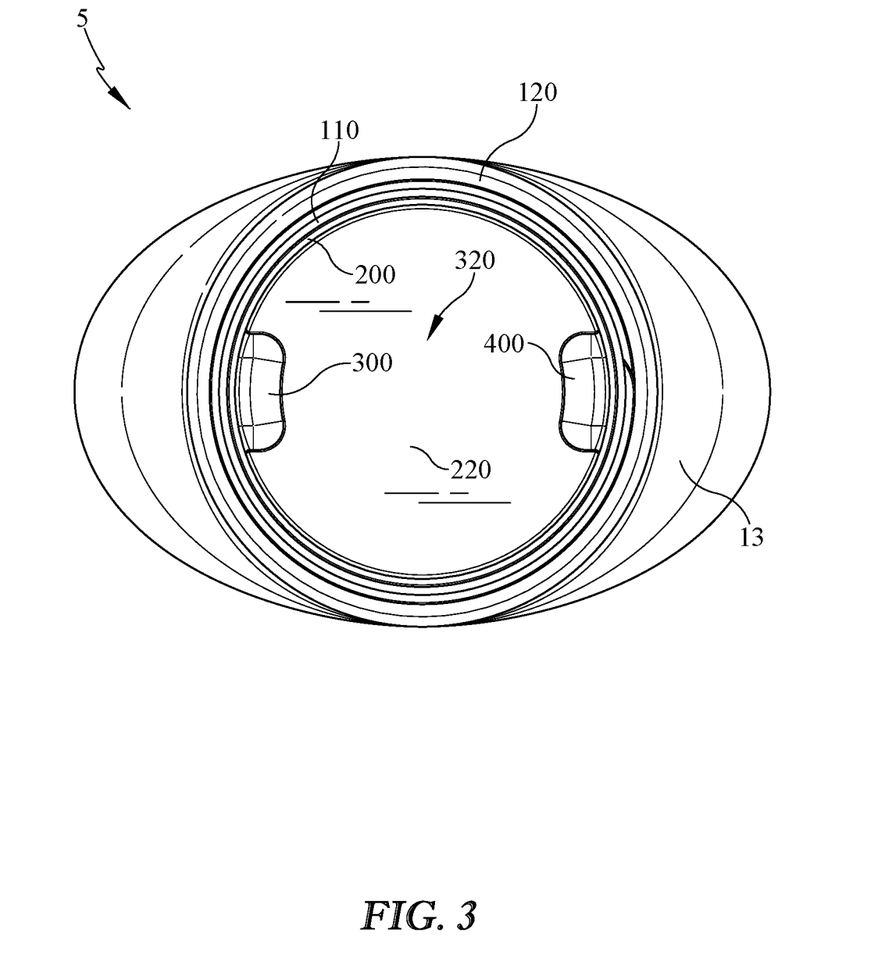
FIG. 3 illustrates a top view of the container and fitment of FIG. 2.

A top view of package 5 is shown in FIG. 3. Insert 200 may be inserted into fitment 100 so that fitment 200 fits inside a bowl 110 of fitment 100. Insert 200 may be configured to have any number of stems 300, 400, such as the two diametrically opposed stems 300, 400 shown in FIG. 3. It is understood that any number of stems or other devices and/or virtually any configuration and/or orientation of stems 300, 400 may be included for any of a variety of reasons including but not limited to providing fluid communication between container 10 and chamber 230. For example, stems 300, 400 may be closer together, there may be only one stem, or there may be any number of stems two or more. For example, there may be four stems disposed approximately 90 degrees apart, or alternatively asymmetrically distributed or disposed, or there may be 6 or 8 that may be evenly spaced or not evenly spaced. There may be any number of stems spaced at any interval. There may be only one stem placed virtually anywhere.

Figure 4:
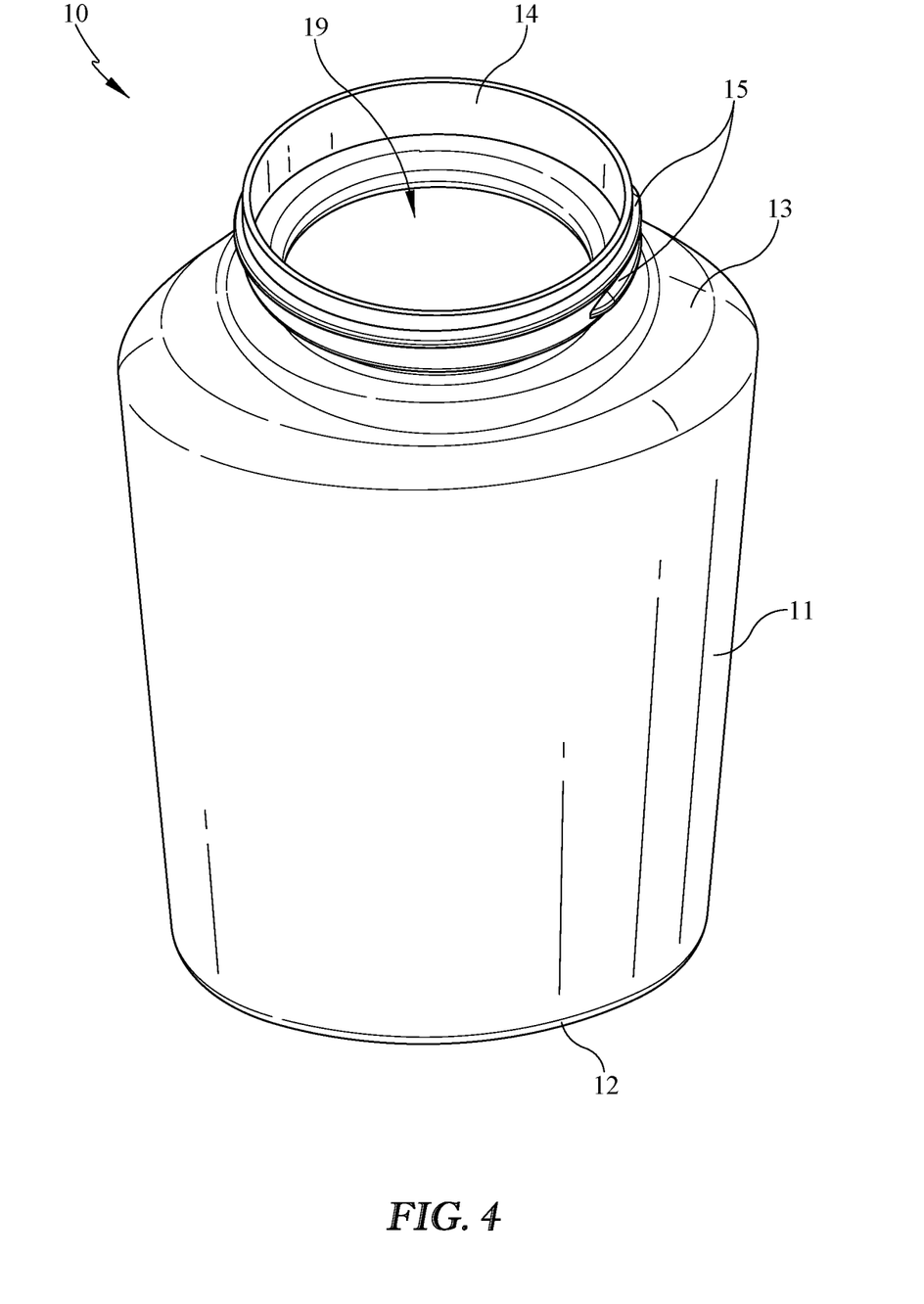
FIG. 4 illustrates a perspective view of the container of FIG. 1.

FIG. 4 shows an embodiment of a container 10 having a neck 14 defining an opening providing access to product storage region 19 in container 10. Neck 14 may include and/or have adjacent thereto one or more attachment mechanisms such as neck threads 15 for coupling and/or attachment to fitment 100 and/or insert 200. For example, fitment 100 may be provided with an internal thread 125 (see FIG. 6) that may couple and/or attach to or otherwise engage container 10. It is understood that, if fitment 100 is removably attached, coupled, or connected to container 10, any of a variety of attachment mechanisms may be used instead of or in addition to a threaded engagement with container 10, such as, for example, a snap fit, an interference fit, and/or a plug fit. In some embodiments, fitment 100 may be substantially permanently attached to container 10 and/or integral with container 10. Container 10 may be at least partially flexible and/or deformable so that a user may squeeze it to cause fluid in product storage region 19 to move upwardly toward and/or through neck 14.

Figure 5:
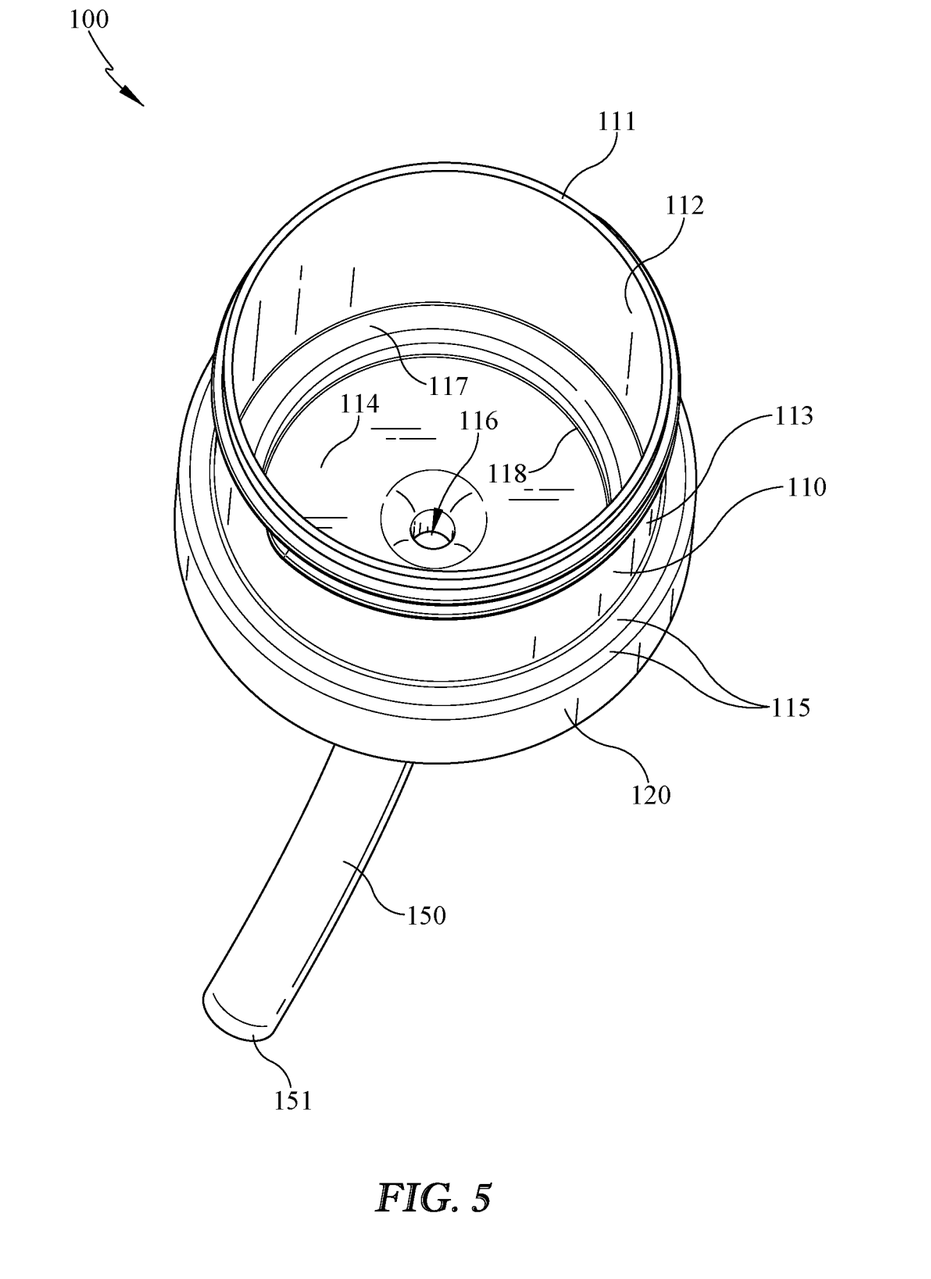
FIG. 5 illustrates a top perspective view of an embodiment of a fitment and straw.
Figure 6:
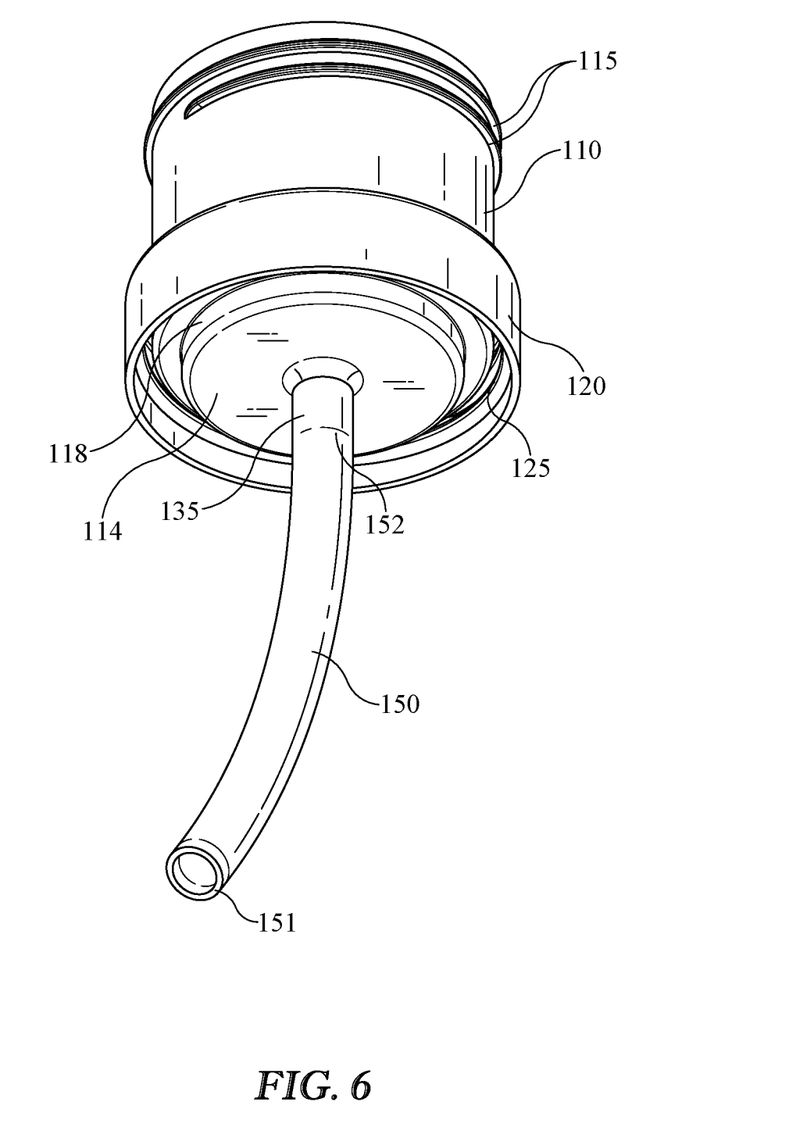
FIG. 6 illustrates a bottom perspective view of the fitment and straw of FIG. 5.

Fitment 100 may be provided with a straw 150 and/or a bowl 110 as shown in FIGS. 5 and 6. Fluid or contents such as a beverage from product storage region 19 of container 10 may pass and/or communicate, for example, upwardly through straw 150, through fitment opening 116 and into bowl 110. For example, if fluid moves upwardly in container 10 as described above, the fluid may enter straw first end 151, move upwardly under pressure through straw 150 toward straw second end 152 that may be attached and/or coupled to a fitment coupling 135, pass through opening 116 and into fitment bowl 110. Fitment 100 may have a top lip 111, a bowl inner surface 112, and/or a bowl outer surface 113. Insert 200 may fit within bowl 110, for example, adjacent or contacting inner surface 112 to form, for example, a friction fit with bowl 110. Fitment 100 may be provided with a floor 114, a shelf 117, and/or a shelf wall 118. As described more below, the bottom or floor 220 of insert 200 may rest on shelf 117 such that a lower chamber is formed between insert floor 220 and fitment floor 114. Fluid may enter fitment 100 through opening 116 and enter into the lower chamber. The fluid may then move outwardly toward shelf wall 118 and upwardly through channels adjacent the outer perimeter of insert 200. The channels may have openings (e.g., openings 326 and/or 426 shown in FIGS. 7 and 8) disposed and/or extending inwardly enough from the side wall to be at least partially unblocked by shelf 117 to allow flow therethrough. Fitment 100 may be provided with a mechanism for attachment to closure 30. For example, fitment 100 may be externally threaded with threads 115 for screw or thread engagement with internal threads of closure 30 (not shown).

Figure 7:
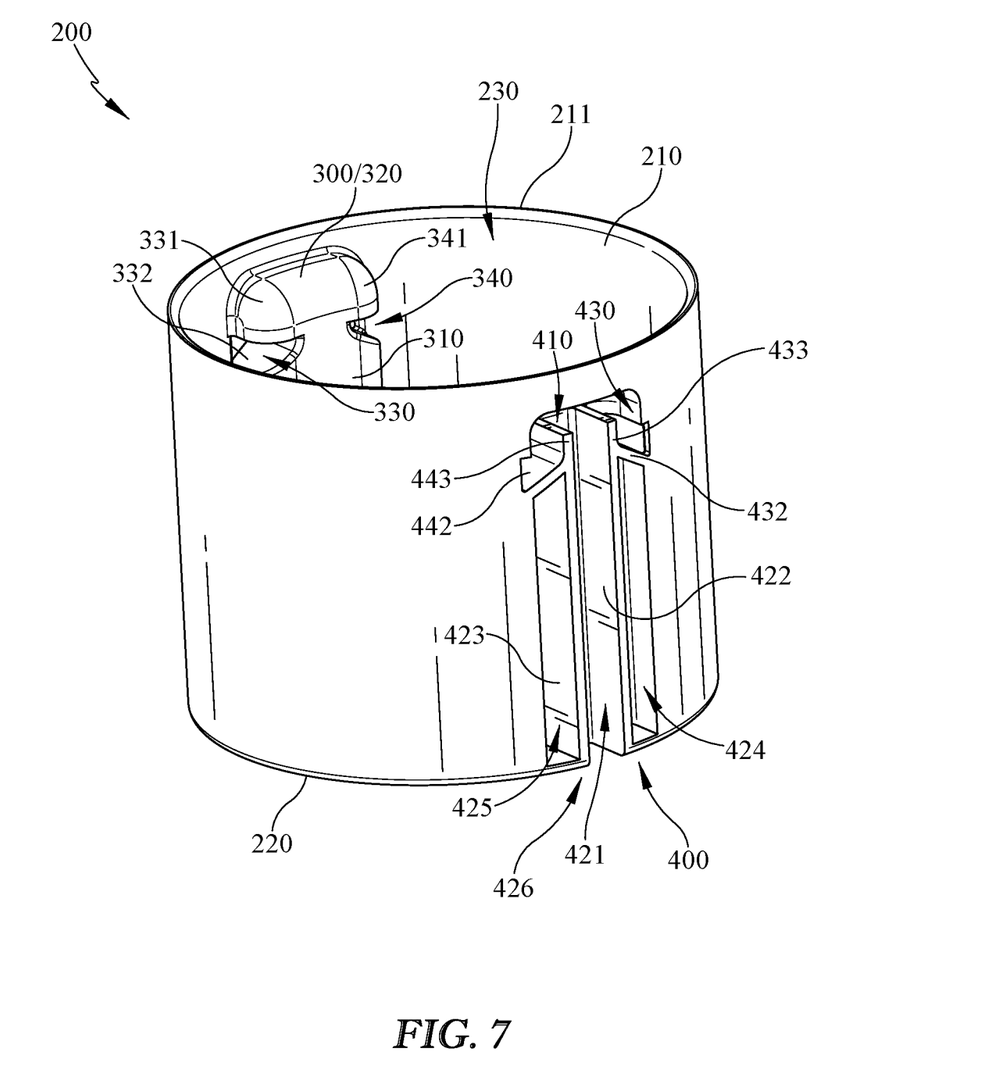
FIG. 7 illustrates a top perspective view of an embodiment of an insert.
Figure 8:
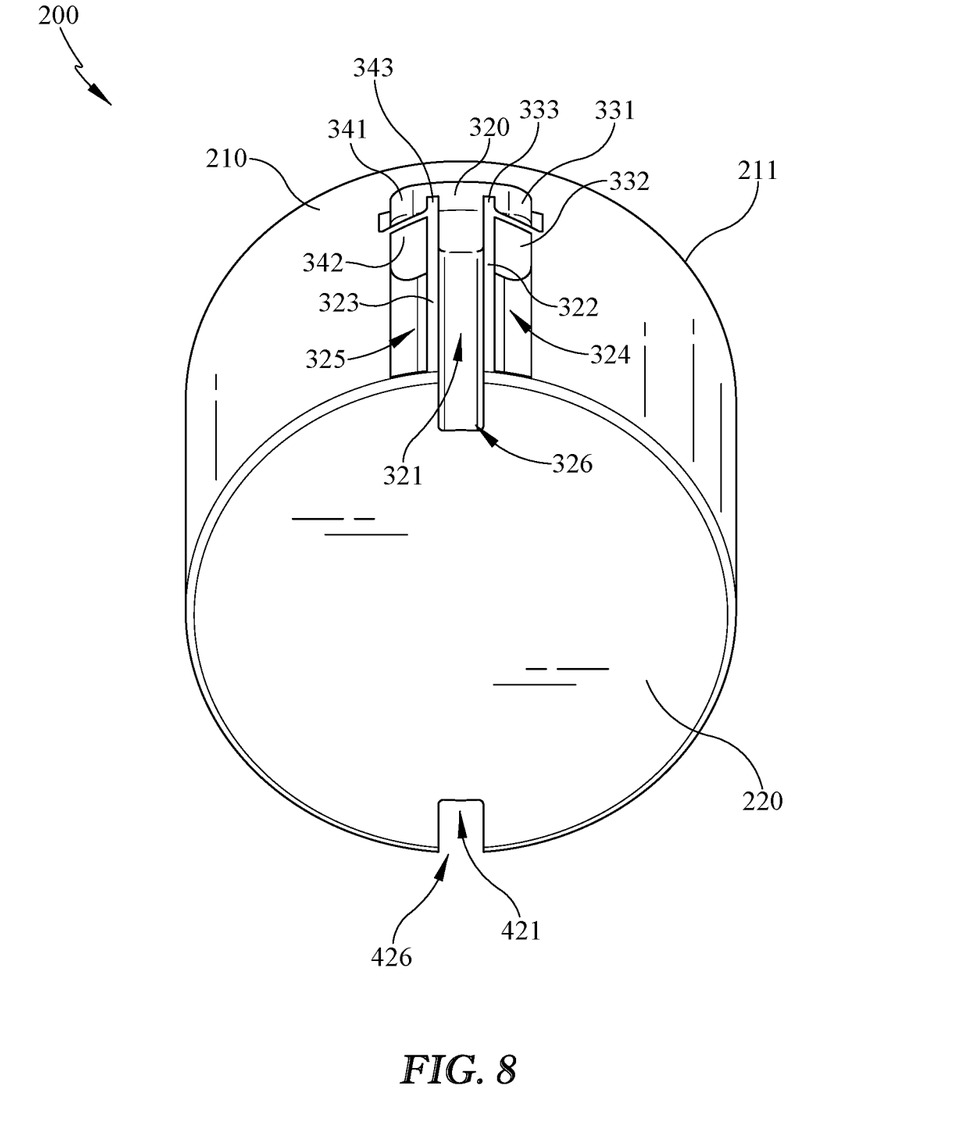
FIG. 8 illustrates a bottom perspective view of the insert of FIG. 7.

FIGS. 7 and 8 illustrate an embodiment of insert 200 in additional detail. Insert 200 may form chamber 230, which may be substantially defined by insert wall 210 and/or insert floor 220. Insert wall 210 may extend between insert floor 220 and insert top lip 211. Chamber 230 may be substantially defined by insert 200, such as by an insert floor 220 and/or an insert side wall 210. Insert 200 may include one or more stems such as a first stem 300 and a second stem 400, for example. If included, first stem 300 may include a passage or conduit 321 in stem body 310, which may be at least partially defined by a first wall 322 and a second wall 323 and which may extend from insert floor 220 and/or opening 326 toward a top or hood 320 of first stem 300. First stem 300 and/or second stem 400 may provide fluid communication between product storage region 19 and chamber 230. Fluid may pass through passage or channel or conduit 321, between first side wall 322 and second side wall 323, be diverted outwardly upon contacting hood 320, flow over first lip 333 and/or second lip 343, be angled outwardly by first floor 332 and/or second floor 342, and pass through one or both outlets 330, 340 (as shown in more detail, for example, in FIG. 9). Hood 320, floor 332, 342, and/or any other component or any combination thereof may be provided to direct and/or regulate the flow and/or dispensing of fluid into chamber 230, for example, to control fluid spilling or splashing out of chamber 230 and/or over top lip 211.

If included, such as is shown in FIGS. 7 and 8, second stem 400 may include a passage or conduit 421 in stem body 410, which may be at least partially defined by a first wall 422 and a second wall 423 and which may extend from insert floor 220 and/or opening 426 toward a top or hood 420 (not shown but may be similar in size, shape, and/or configuration as hood 320, for example) of second stem 400. Fluid may pass through passage or channel or conduit 421, between first side wall 422 and second side wall 423, be diverted outwardly upon contacting hood 420, flow over first lip 433 and/or second lip 443, be angled outwardly by first floor 432 and/or second floor 442, and pass through one or both outlets 430, 440 (not shown but may be similar in size, shape, and/or configuration as hood outlet or outlets 330, 340, for example). Hood 420, floor 432, 442, and/or any other component or any combination thereof may be provided to direct and/or regulate the flow and/or dispensing of fluid into chamber 230, for example, to control fluid spilling or splashing out of chamber 230 and/or over top lip 211.

Any or all of first stem side wall 322, first stem second side wall 323, second stem side wall 422, and second stem second side wall 423 may define, for example, the height of passage(s) 321, 421 and/or the height of the separation from chamber 230. This may define the fill level of chamber 230 and/or insert 200, for example, at equilibrium when actuation or squeezing force is removed from container 10. For example, as the actuation or squeezing force is removed, pressure may return to equilibrium between chamber 230 and product storage region 19, which may result in contents above the fill level to move (e.g., be sucked) down into passage(s) 321, 421 or below.

Figure 9:
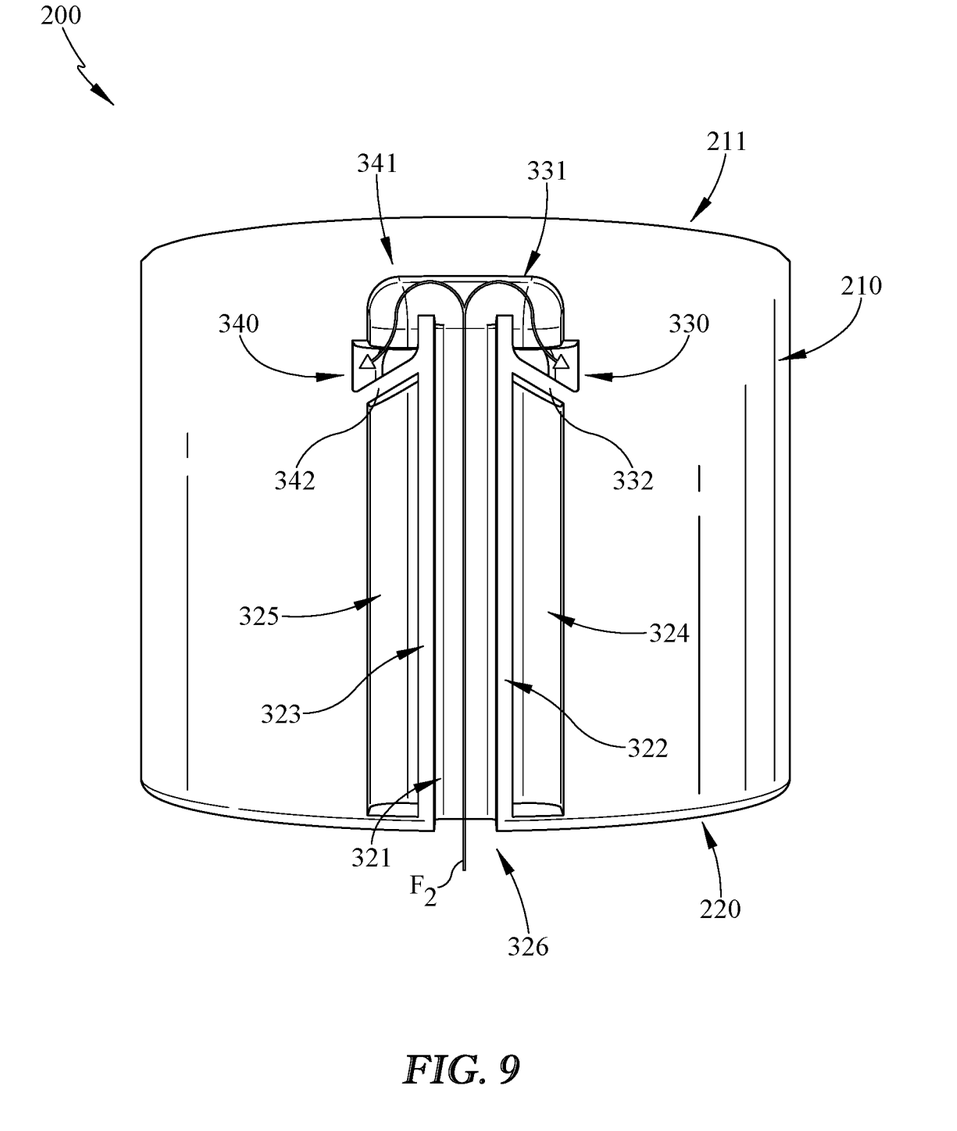
FIG. 9 illustrates a front perspective view of an embodiment of an insert.

An example flow path $F_2$ through stem 300 is shown in FIG. 9. As described above, fluid may enter first stem 300 in a flow path $F_2$, may travel upwardly through first stem 300, contact and/or be diverted by hood 320 (and/or first hood end 331 or second hood end 341) such that flow path $F_2$ is divided into two or more exiting flows and out through first and second outlets 330, 340, respectively.

Figure 10:
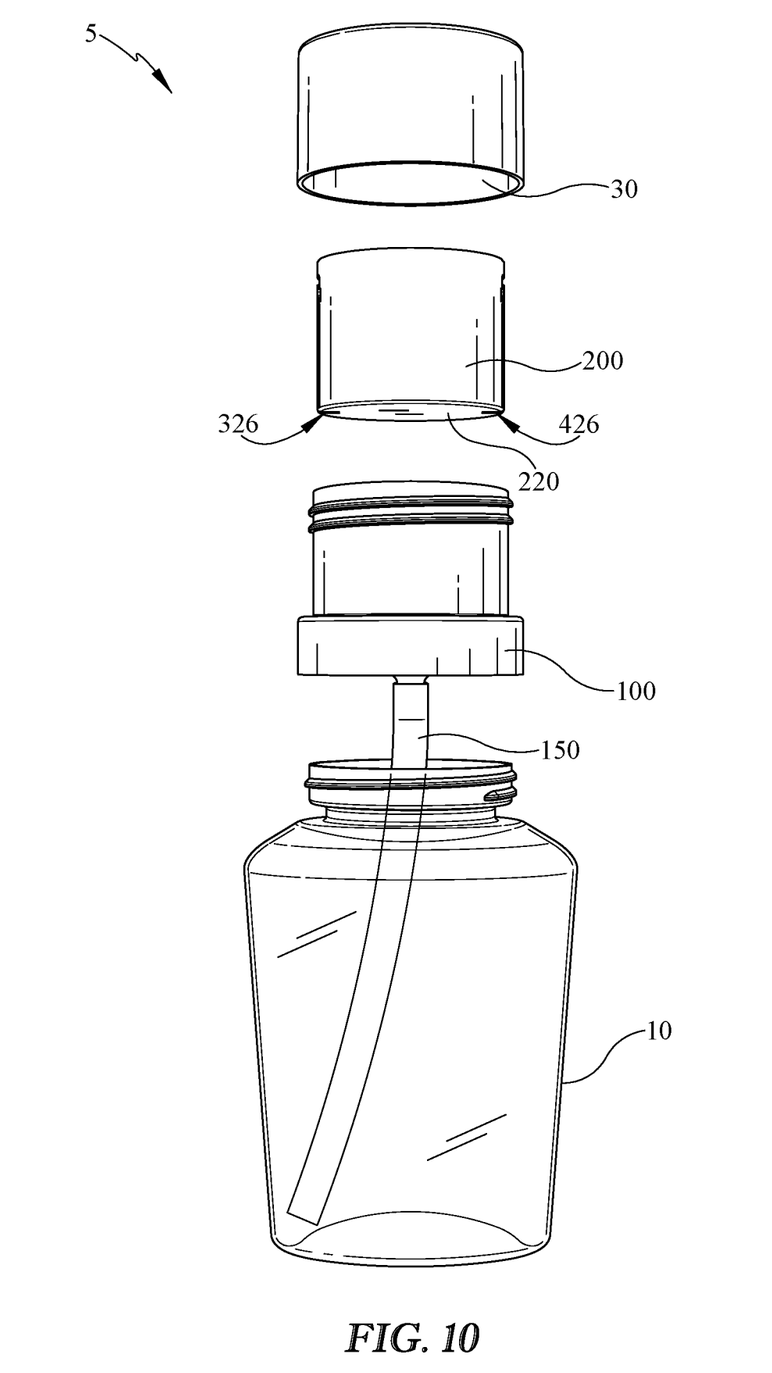
FIG. 10 illustrates an exploded assembly view of components of an embodiment of a container with a fitment and a closure.

The components of package 5, if included, may be oriented as shown in the exploded assembly view of FIG. 10. For example, insert 200 may fit in fitment 100. Fitment 100 may couple and/or attach to container 10. Closure 30 may couple and/or attach to fitment 100 to close fitment 100, insert 200, and/or container 10. Straw 150 may extend downwardly from fitment 100 toward the bottom of container 10 and/or into product storage region 19. In use, to form package 5, container 10 may be filled with contents on a filling line or the like, straw 50 may be coupled fitment 100 or may be formed integrally with fitment 100, insert or adapter 200 may be placed into fitment 100, closure 30 may be coupled to fitment 100 and/or adapter 200, and/or fitment 100 (or combination fitment 100, adapter 200, and/or closure 30) may be coupled to container 10, for example. Package 5 may be provided to a user with liquid or flowable contents therein, and the user may remove closure 30, provide an input to package 5 (for example, squeezing container 10 force the flowable contents up straw 150 and/or into adapter 200) so the user can access the predetermined amount of contents in adapter 200.

Figure 11:
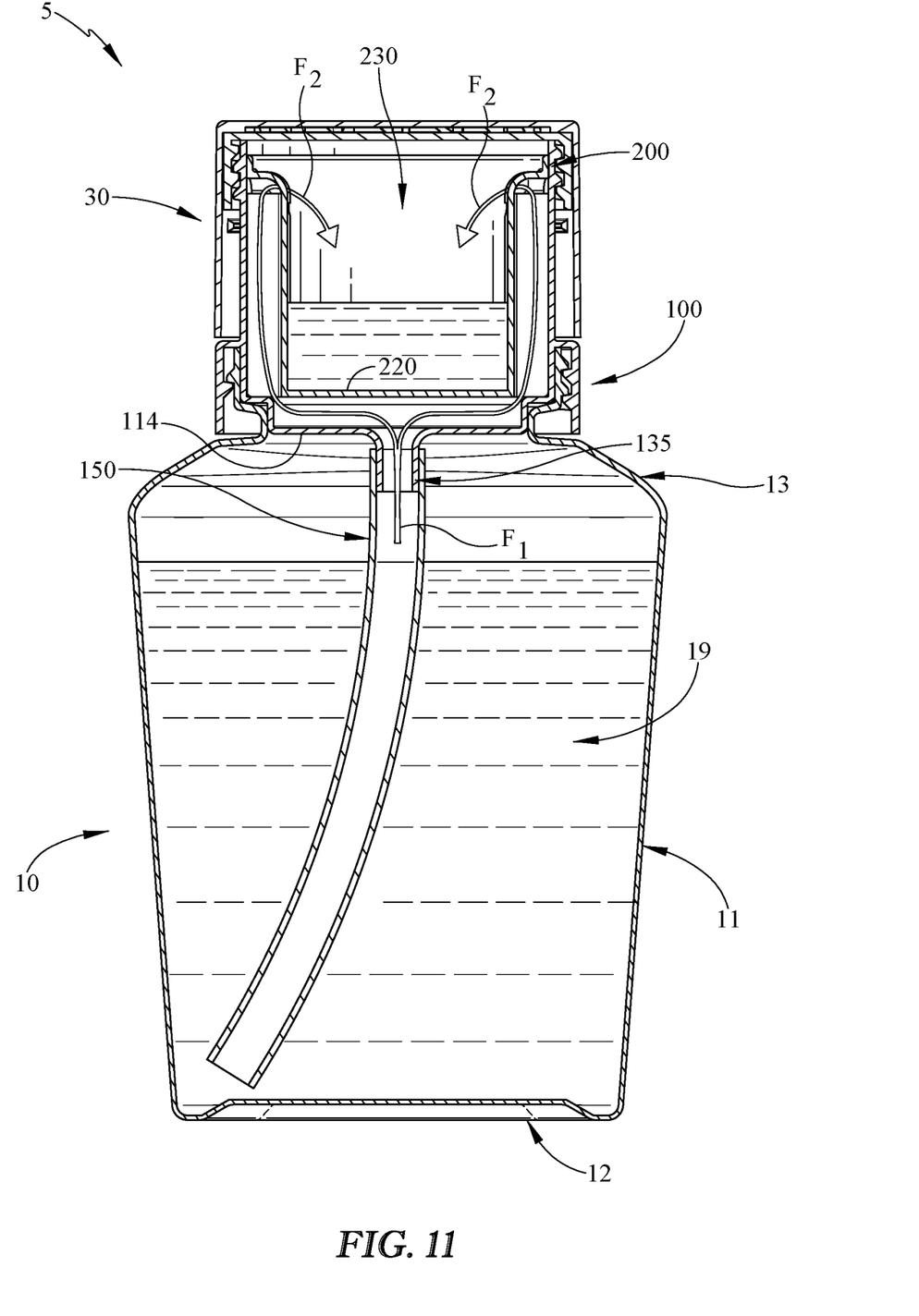
FIG. 11 illustrates a cross section view of the assembled container with closure of FIG. 10.

Package 5 is shown in cross section in FIG. 11. Fluid such as beverage in product storage region 19 may flow upwardly through straw 150 such that flow path $F_1$ enters fitment coupling 135 and the flow may separate in lower chamber between fitment floor 114 and insert floor 220. The fluid may then flow upwardly into the stems such as first stem 300 and second stem 400 as described above.

It is understood that package 5 and/or any component thereof may be made of any of a variety of materials, including, but not limited to, any of a variety of suitable plastics material, any other material, or any combination thereof. Suitable plastics material may include, but is not limited to, polyethylene terephthalate (PET), polyethylene (PE), polypropylene (PP), polystyrene (PS), high-density polyethylene (HDPE), low-density polyethylene (LDPE), linear low-density polyethylene (LLDPE), crystallized polyethylene terephthalate (CPET), mixtures and combinations thereof, or any other plastics material or any mixtures and combinations thereof. It is understood that multiple layers of material may be used for any of a variety of reasons, including to improve barrier properties, or to provide known functions related to multiple layer structures. The multiple layers, if included, may be of various materials, including but not limited to those recited herein.

It is further understood that package 5 or any component thereof may be substantially rigid, substantially flexible, a hybrid of rigid and flexible, or any combination of rigid, flexible, and/or hybrid, such as having some areas be flexible and some rigid. It is understood that these examples are merely illustrative, are not limiting, and are provided to illustrate the versatility of options available in various embodiments of package 5.

It is further understood that any of a variety of processes or combination thereof may be used to form package 5 and/or bottle or container 10, any component thereof, or any layer or substrate used therein. For example, any component, layer, or substrate, or combination thereof, may be thermoformed, injection molded, injection stretch blow molded, blow molded, extrusion blow molded, coextruded, subjected to any other suitable process, or subjected to any combination thereof. In some embodiments, container 10 and/or any component thereof may be formed substantially of injection stretch blow molded PET, although other materials and forming processes may be used instead of or in addition to PET and injection stretch blow molding, respectively. Various materials and/or processes may be used to form package 5 and/or any component thereof as will be understood by one of ordinary skill in the art. In some embodiments, container 10 may be substantially a one-piece design and/or substantially formed as an integral or unitary structure.

These and other modifications and variations may be practiced by those of ordinary skill in the art without departing from the spirit and scope, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope of the appended claims should not be limited to the exemplary description of the versions contained herein.

That which is claimed:

1. A package, comprising:
    a container defining a product storage region; and
    a fitment and adapter coupled to the container and in fluid communication with the product storage region;
    wherein the adapter includes a side wall and a floor substantially defining a chamber, and at least one stem adjacent the side wall and extending upwardly from the adapter floor;
    wherein the at least one stem has at least one outlet allowing fluid from the product storage region flowing through the fitment and adapter to enter the chamber.

2. The package of claim 1, wherein the stem includes a hood configured to direct the fluid into the chamber to resist splashing out of the chamber.

3. The package of claim 1, wherein the stem includes at least one outlet floor.

4. The package of claim 3, wherein the at least one outlet floor is angled outwardly and downwardly to facilitate a smooth flow into the chamber.

5. The package of claim 1, wherein the adapter is removable from the fitment.

6. The package of claim 5, wherein the adapter is friction fit in a bowl of the fitment.

7. The package of claim 5, wherein the adapter is snap fit in a bowl of the fitment.

8. The package of claim 1, wherein the fitment includes a floor spaced apart from the floor of the adapter, wherein a lower chamber is disposed between the fitment floor and the adapter floor.

9. The package of claim 8, wherein the fitment floor includes a central portion with an opening in fluid communication with the product storage region, and the adapter floor includes at least one floor opening adjacent the side wall and out of vertical alignment with the fitment central portion opening, such that fluid flow is directed outwardly relative to a central axis from the central portion to the adapter floor opening to enter the at least one stem and adapter chamber.

10. The package of claim 1, wherein the adapter is configured to hold a predetermined amount of liquid at or below the stem outlet.

11. The package of claim 10, wherein the predetermined amount is between half an ounce and two ounces.

12. A combination fitment and insert for a container, comprising:
    a fitment configured to be coupled to a container, the fitment including a bottom opening and a bowl above the bottom opening; and
    an insert insertable into the bowl of the fitment and in fluid communication with the fitment, the insert having a floor and a sidewall defining a chamber;
    wherein the insert includes at least one stem adjacent the sidewall and extending upwardly from the insert floor;
    wherein the at least one stem has at least one outlet allowing fluid from the product storage region flowing through the fitment and insert to enter the chamber.

13. The combination fitment and insert of claim 12, wherein the insert is removable from the fitment.

14. The combination fitment and insert of claim 12, wherein the stem includes a hood configured to direct the fluid into the chamber to resist splashing out of the chamber.

15. The combination fitment and insert of claim 12, wherein the fitment includes a floor spaced apart from the floor of the adapter, wherein a lower chamber is disposed between the fitment floor and the adapter floor.

16. An insert for a fitment, comprising:
    a floor and sidewall defining a chamber, and
    at least one stem adjacent the sidewall and extending upwardly from the floor;
    wherein the at least one stem defines a fluid channel,
    wherein the floor includes at least one peripheral opening allowing fluid to enter from below the floor and into the stem,
    wherein the stem includes at least one outlet allowing fluid communication from the stem to the chamber.

17. The insert of claim 16, wherein the stem includes a hood configured to direct the fluid at least one of downwardly and outwardly into the chamber to resist splashing out of the chamber.

18. The package of claim 16, wherein the stem includes at least one outlet floor.

19. The package of claim 16, wherein the chamber is configured to hold a predetermined amount of liquid at or below the stem outlet.

20. The package of claim 19, wherein the predetermined amount is between about half an ounce and about two ounces.

* * * * *